Dec. 4, 1928.

G. BEUFORD

HARNESS

Filed Dec. 9, 1927

Inventor
George Beuford,

By *Jaeslie & Jaeslie*

Attorneys

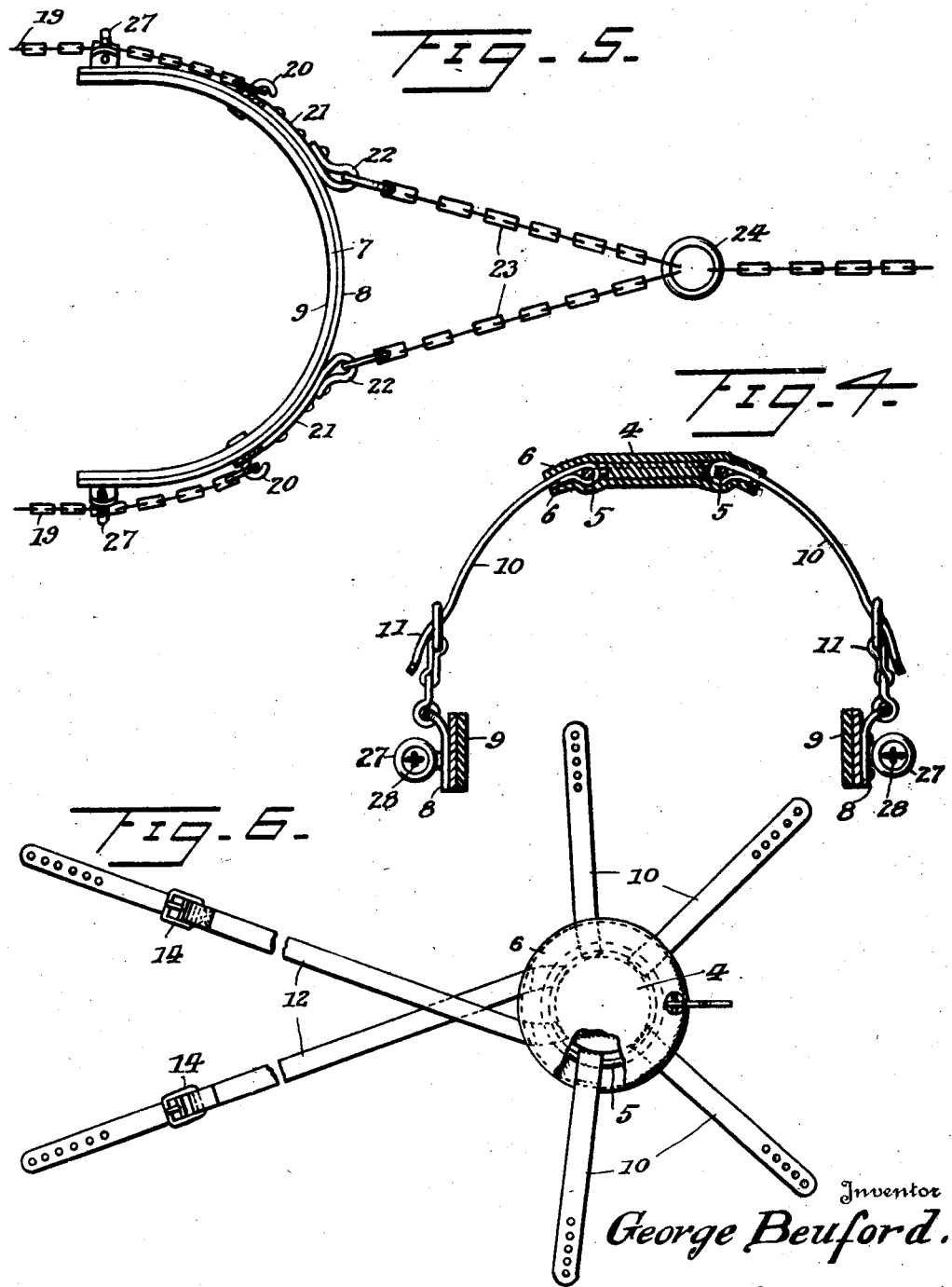

Patented Dec. 4, 1928.

1,693,743

UNITED STATES PATENT OFFICE.

GEORGE BEUFORD, OF PAGETON, WEST VIRGINIA, ASSIGNOR OF ONE-HALF TO WILLIAM E. COOK, OF PAGETON, WEST VIRGINIA.

HARNESS.

Application filed December 9, 1927. Serial No. 238,805.

This invention relates generally to harness for horses or mules and particularly to a half loop harness for mules used in mines.

Among the purposes and objects of the invention are to provide a harness whereby the labor incident to drawing the cars through the mines will be materialy reduced, and whereby the draft strain will be more evenly distributed and whereby weight and strain upon the horse's collar will be considerably lessened by distributing the weight and strain upon a saddle strap and breeching.

With these and other objects in view, my invention consists in the novel features of construction, combination and arrangement of parts as will be hereinafter referred to and more particularly pointed out in the specification and claim.

In the accompanying drawings,—

Figure 1 is a view of a horse or mule equipped with the harness;

Figure 2 is an elevation of the hames on line 2—2 of Fig. 1;

Figure 3 is a view of the saddle strap and belly-band on the line 3—3 of Figure 1;

Figure 4 is a sectional view on the line 4—4 of Figure 1;

Figure 5 is a plan view of the breeching and attachments; and

Figure 6 is a plan view of the spider and supporting strap connected therewith, a portion of the spider pad being broken away to show the spider ring, and manner of connecting the strap thereto.

Referring now more particularly to the drawings by numerals of reference, and at this time to Figure 1, in which I have illustrated the application of my improved harness to a horse or mule, 1 designates the hames of the usual construction having the hook and chain fastener 2, also common in the art, said hames being also provided with the trace rings 3.

The harness proper comprises a centering spider 4, which includes a metal ring 5, suitably covered upon each side with leather pads 6 to prevent chafing the animal and also as a guard against rust. A breeching 7 comprising a curved steel spring strip 8, to which is riveted upon its inner face a leather padding strip 9, is supported upon the rear of the animal by means of four straps 10, the upper ends of which are joined to the spider ring 5, while the lower ends, through the medium of adjusting buckles 11 are connected at spaced intervals to the breech strip 8.

Connected at one end with the trace rings 3 on the hames 1, and at the other end with the ring 5 of the spider 4, are a pair of back straps 12, adjustable through buckles 14, these straps 12, intermediate their ends, passing through loops 15 formed in the saddle strap 16, the lower portion forming the belly-band 17, having securing buckle 18.

The main traces 19, in the present instance shown as chains, are each connected at their forward ends with the trace rings 3, and at their extreme rear ends are secured to hooks 20 formed on the forward ends of metal plate 21 riveted to the metal strip 8 of the breeching 7, toward the rear of the latter. The rear portions of these metal-plates 21 terminate in loops 22 connecting with the tail chains 23, which in turn are connected with the load through draft chain and ring 24.

At a forward intermediate portion of their length, the trace chains each are connected with the saddle strap 16 through the medium of an elongated link 25 which passes through straps 26 secured on each side of said saddle strap at about its junction with the belly-band. Toward their rear ends, the trace chains each pass through a metal ring 27 secured upon each side of the metal breeching strip 8, the opening 28 in each of these rings consisting of an upright elongated slot, serving to cooperate with a link of the chain, and by proper manipulation of the latter adjusting and locking said chain and ring relatively to one another as will be readily appreciated, and thus properly adjusting the arrangement of the harness on the animal. Additional tug chains 29 may be connected with the trace rings 3, and rings 30 with the trace chains as shown in Figure 1.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having described my invention, what I claim as new and desire to protect by Letters Patent is:—

Harness for a draft animal comprising a collar, a belly band and a breeching strap, traces connected at one end with the collar and at their other ends with the breeching strap and connected at points intermediate their ends with the belly band, draft members connected with the breeching strap, a spider ring adapted to rest upon the rump of the animal, billet straps connecting the spider ring with the breeching strap at spaced intervals and back straps connected at one end with the spider ring and crossing each other over the back of the animal, and connected at their other ends with the collar at the forward ends of the traces, the intermediate portions of the back straps slidably engaging the belly band.

In testimony whereof I affix my signature.

GEORGE BEUFORD.